(12) United States Patent
Watson

(10) Patent No.: US 7,233,087 B2
(45) Date of Patent: Jun. 19, 2007

(54) ELECTROMAGNETICALLY DRIVEN ROTARY MOTOR

(76) Inventor: Charles S. Watson, 6415 - 13 Massachusetts Ave., New Port Richey, FL (US) 34653

( * ) Notice: Subject to any disclaimer, the term of this patent is extended or adjusted under 35 U.S.C. 154(b) by 284 days.

(21) Appl. No.: 11/047,391

(22) Filed: Jan. 31, 2005

(65) Prior Publication Data
US 2006/0170302 A1 Aug. 3, 2006

(51) Int. Cl.
*H02K 7/06* (2006.01)
(52) U.S. Cl. ............... 310/80; 310/75 A; 310/113; 310/103
(58) Field of Classification Search ............ 310/75 A, 310/80, 113, 103–105, 12–15
See application file for complete search history.

(56) References Cited

U.S. PATENT DOCUMENTS

| | | | |
|---|---|---|---|
| 2,471,947 A * | 5/1949 | Giannini | 341/178 |
| 2,996,650 A * | 8/1961 | Roberti et al. | 318/623 |
| 3,935,487 A | 1/1976 | Czerniak | |
| 4,314,169 A | 2/1982 | Rusu | |
| 4,392,071 A | 7/1983 | Gauthier | |
| 5,594,289 A | 1/1997 | Minato | |
| 5,975,714 A | 11/1999 | Vetorino et al. | |
| 6,220,719 B1 | 4/2001 | Vetorino et al. | |
| 6,331,744 B1 | 12/2001 | Chen et al. | |
| 6,590,312 B1 | 7/2003 | Seguchi et al. | |
| 6,700,263 B1 * | 3/2004 | Kong et al. | 310/103 |
| 2003/0102753 A1 | 6/2003 | Sprain | |
| 2005/0023916 A1 * | 2/2005 | Moe | 310/103 |

* cited by examiner

*Primary Examiner*—Dang Le
(74) *Attorney, Agent, or Firm*—Larson & Larson; Herbert Larson

(57) ABSTRACT

Electric energy from a battery is employed to shift the permanent magnetic field located in a generator. A spring housing is located distal from the generator. An outer magnet housing enclosing an inner rotating magnetic housing is positioned between the generator and the spring housing. A shaft is integral with and turns with the inner magnetic housing. An end of the shaft distal from the inner magnetic housing passes through the generator and is actuated by a sensor mounted over the shaft end.

16 Claims, 8 Drawing Sheets

ELECTROMAGNETICALLY DRIVEN ROTARY MOTOR

BACKGROUND OF THE INVENTION

The invention relates to a motor driven by a magnetic field. More particularly, it refers to a plurality of magnets oscillating to change a flux from north to south to run a permanent magnet rotor type motor.

U.S. Pat. No. 4,571,528 describes stator magnets having pole forces with a gap in-between and a uniform magnetic flux density thereacross. A rotor having permanent magnets disposed radially outwardly from the rotor axis is positioned within the gap and the rotor magnets interact with the magnetic field of stator magnets through repulsion or attraction. An electronic control induces an electromagnetic field from an external source of energy to attract each of the rotor magnets as it exits the stator gap and induces an electromagnetic field to repulse each of the rotor magnets as it enters the stator gap to enhance rotation. Although this method produces torque to turn a motor shaft, a search continues for more efficient ways of enhancing shaft rotation and increasing torque using electromagnetic forces.

SUMMARY OF THE INVENTION

The present invention provides a system for producing angular torque and momentum employing permanent magnet wave energy. Electric energy from a battery is employed only to shift the permanent magnetic fields. In this invention either the rotor can produce linear motion with the stator rotating and being the driven shaft or the stator can produce linear motion and the rotor will be the driven shaft. The magnets employed oscillate and rotate so that all magnetic fields move and interact constantly. Linear motion changes flux and produces rotary motion by constant repulsion and attraction of the permanent magnets.

BRIEF DESCRIPTION OF THE DRAWINGS

This invention can be best understood by those having ordinary skill in the art by reference to the following detailed description, when considered in conjunction with the accompanying drawings in which.

DETAILED DESCRIPTION OF THE INVENTION

Figure 1:
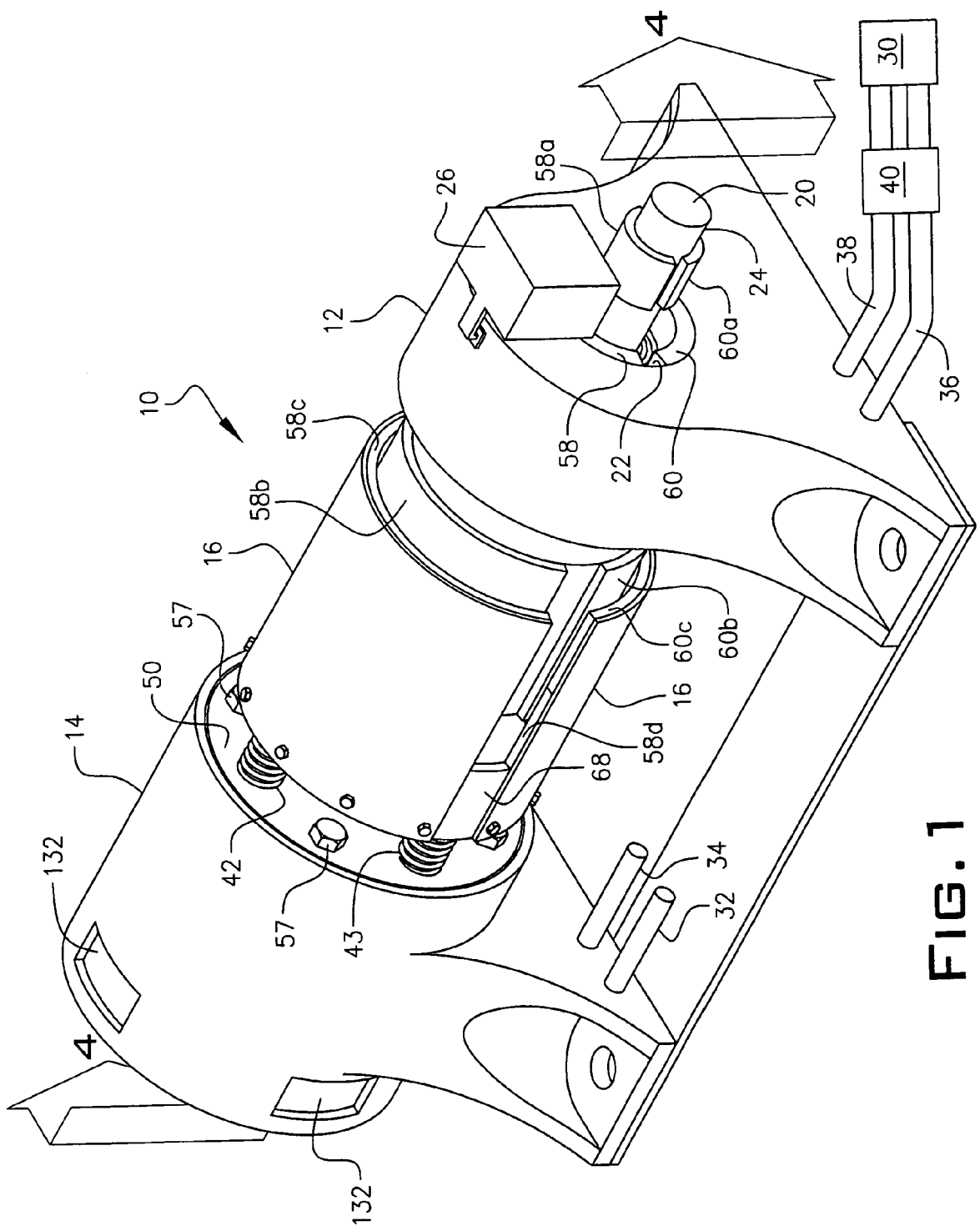
FIG. 1 is a perspective view of the magnetically driven motor of this invention energized with springs depressed.

Throughout the following detailed description, the same reference numerals refer to the same elements in all figures.

Figure 2:
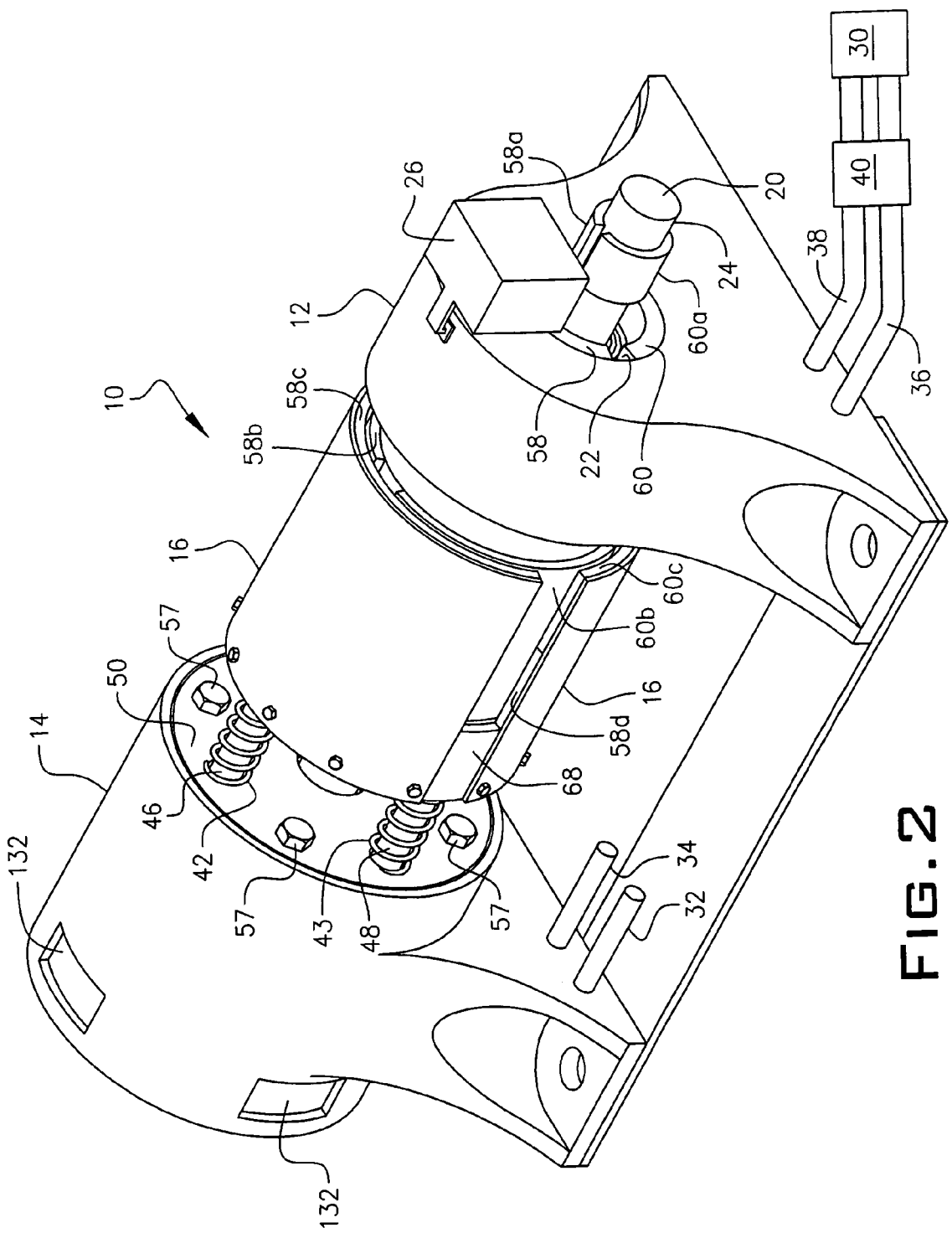
FIG. 2 is a perspective view of the magnetically driven motor of this invention with non-compressed springs.
Figure 3:
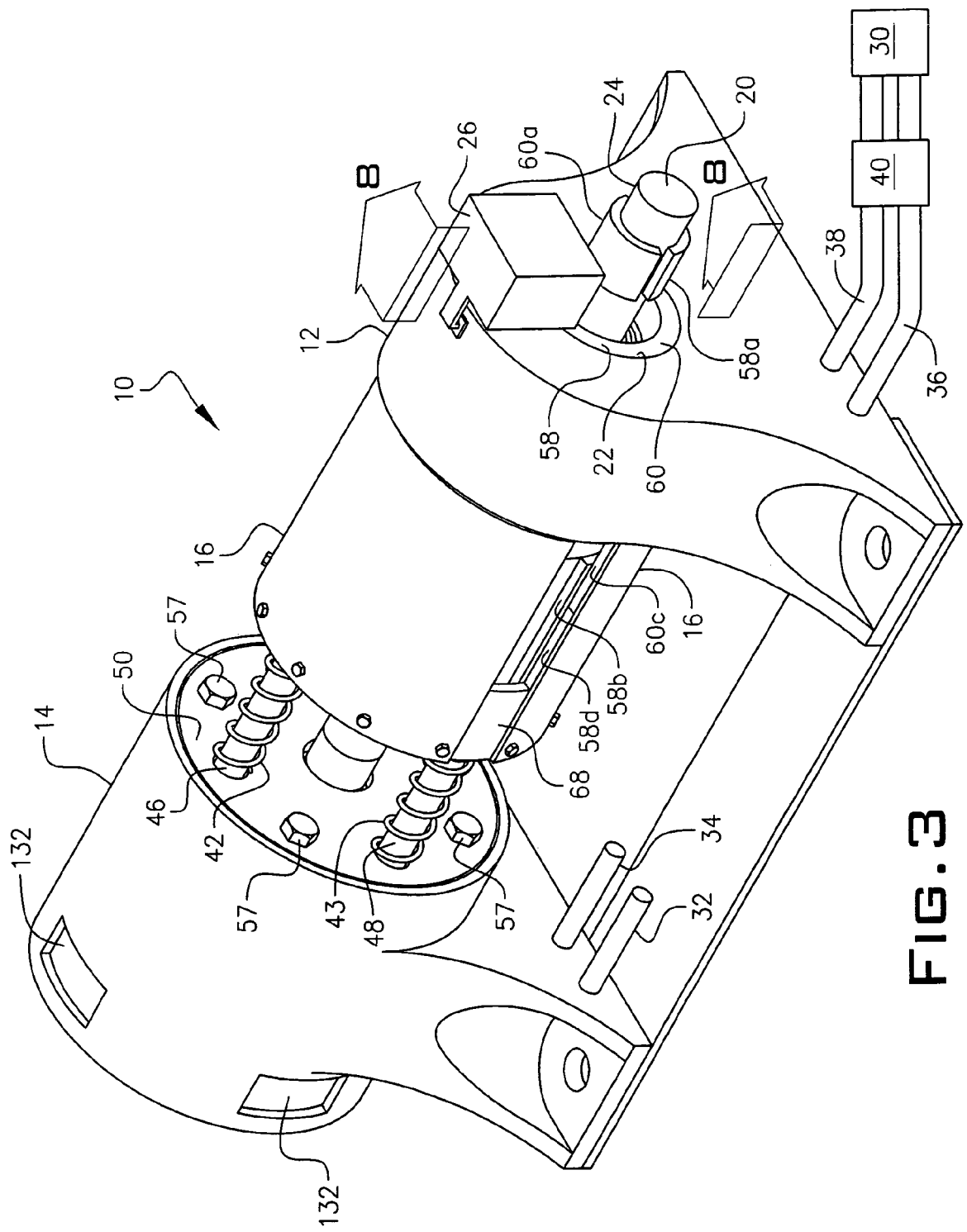
FIG. 3 is a perspective view of the magnetically driven motor de-energized with its outer magnetic housing moved away from the coil plate.
Figure 8:
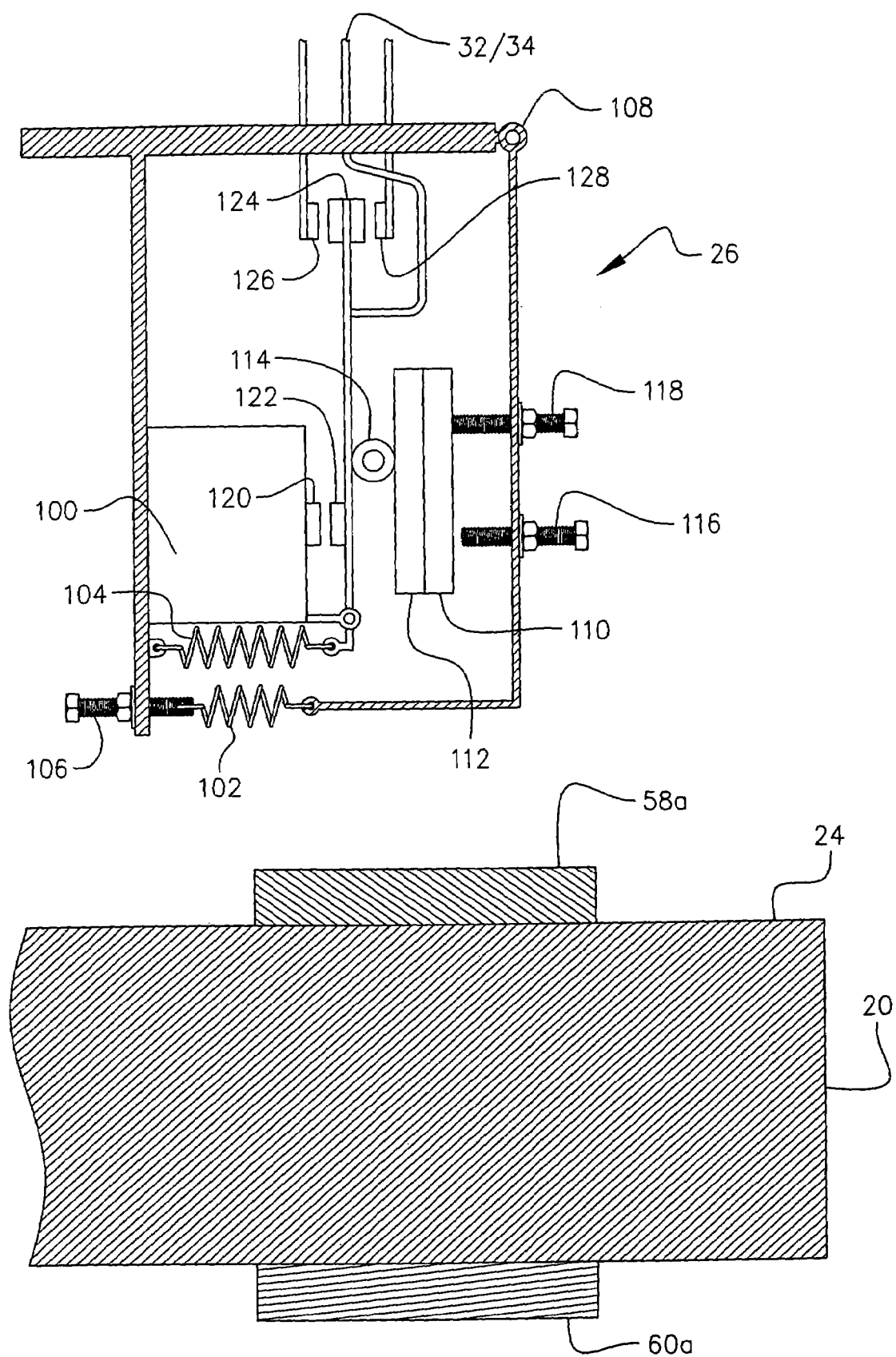
FIG. 8 is a cross-sectional view of the magnetic sensor mounted above an end portion of the drive shaft in cross-section.

Referring first to FIGS. 1-3 the magnetically driven motor 10 has a generator 12 at a first end and a spring housing 14 at a second end. Between the generator 12 and spring housing 14 is an outer magnetic housing 16 enclosing an inner magnetic housing or rotor 18. See FIG. 4. A drive shaft 20 protrudes through an axial opening 22 in generator 12 and the drive shaft 20 is connected to inner rotating housing 18 distal from the generator 12. An end portion 24 of shaft 20 is observed by a magnetic sensor 26. (FIG.8). A D.C. current is emitted to wires 32 and 34 which are connected to the spring housing 14. Wires 36 and 38 lead to a wave rectifier 40 which converts A.C. to D.C. current and recharges battery 30. As seen in FIG. 8, the magnetic sensor 26 has a pair of springs 102 and 104. Threaded screw 106 connected to spring 102 controls the pivoting of the sensor 26 elements at pivot point 108. A north field magnet 110 and a south field magnet 112 pivot over an annular pin 114. Adjustment threaded bolts 116 and 118 respectively adjust the position of magnet 110 and 112. A relay coil 100 has an iron core 120 spaced apart from movable armature 122 on movable contact 124. Spring 104 keeps tension on movable contact 124. Positive contact 126 and negative contact 128 change magnetic field poles as the sensor reacts to the shaft end 24 containing north magnet 58a and south magnet 60a spaced apart on the shaft end.

The signal from sensor 26 energizes tension springs 42, 43, 44 and 45 surrounding the ends of mounting rods 46, 47, 48 and 49 respectively between coil plate 50 and drum 68. Coil plate 50 is connected to keeper plate 52 within spring housing 14 by studs 70 and 72. The studs have threaded ends which are threaded into threaded openings in coil plate 50 at one end and pass through openings 51 in keeper plate 52 at the other end. Nuts 53 are used to secure the studs in place behind keeper plate 52. See FIG. 6.

Figure 4:
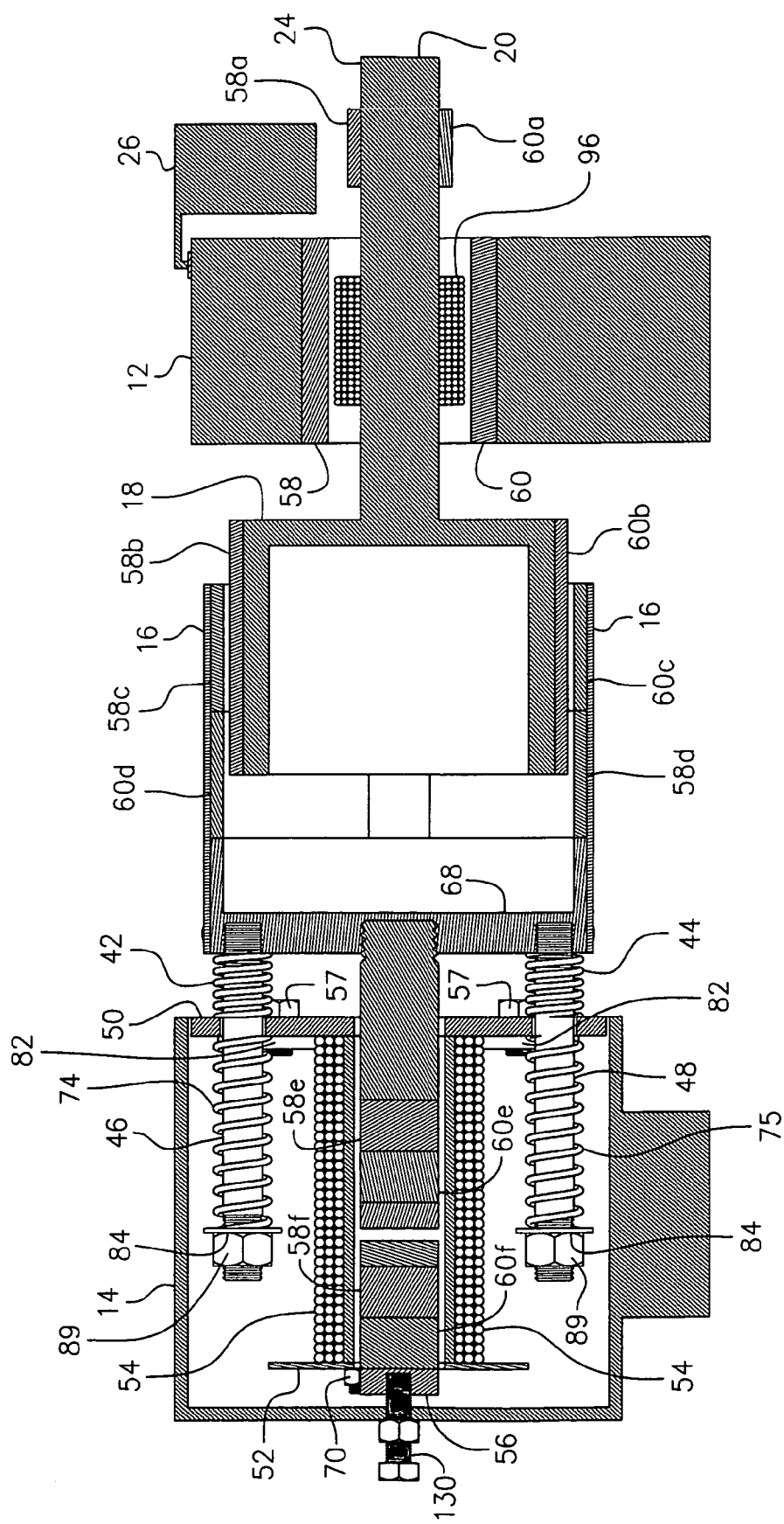
FIG. 4 is a sectional view of the magnetically driven motor along line 4-4 in FIG. 1.
Figure 5:
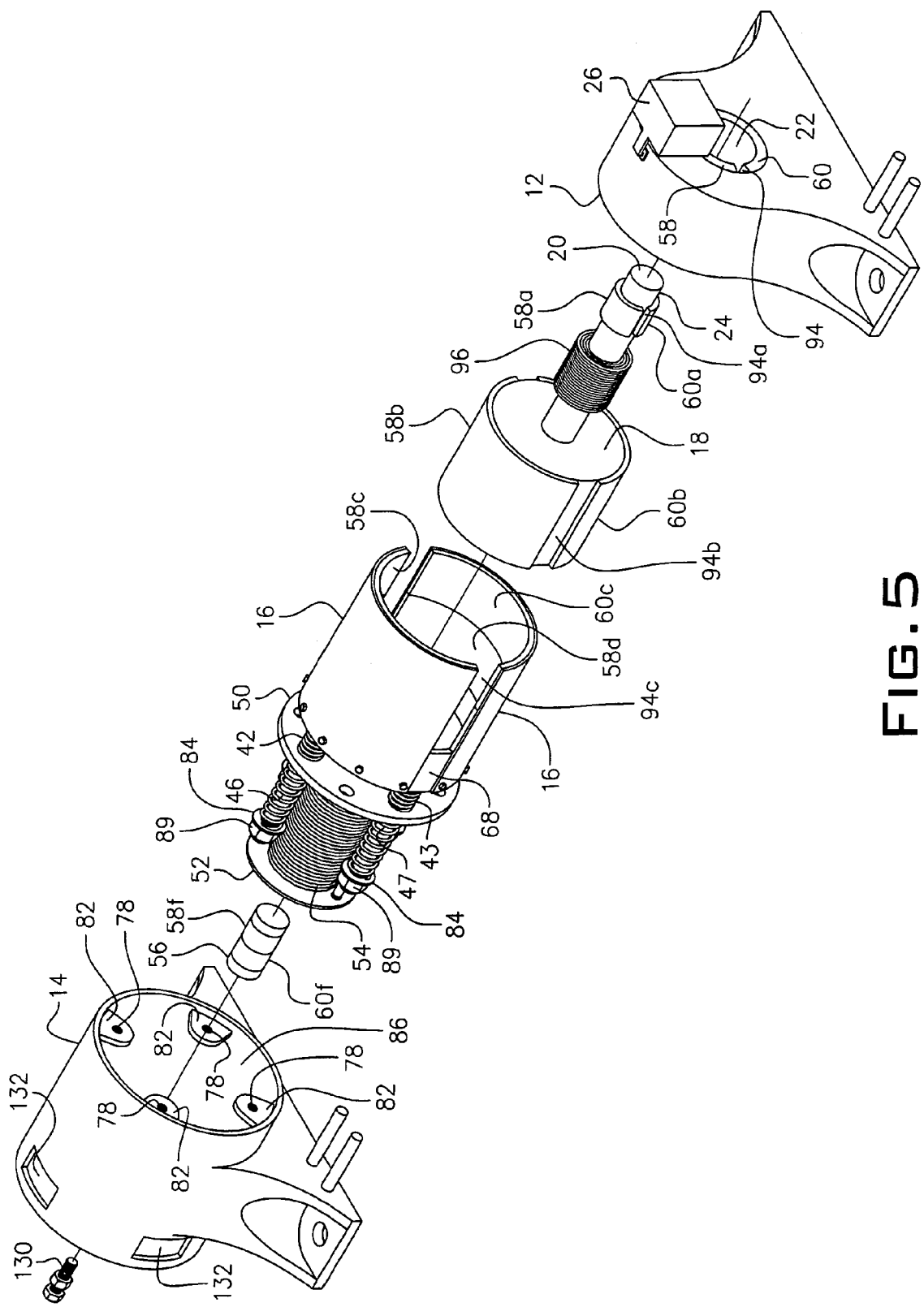
FIG. 5 is an exploded view of the magnetically driven motor.
Figure 6:
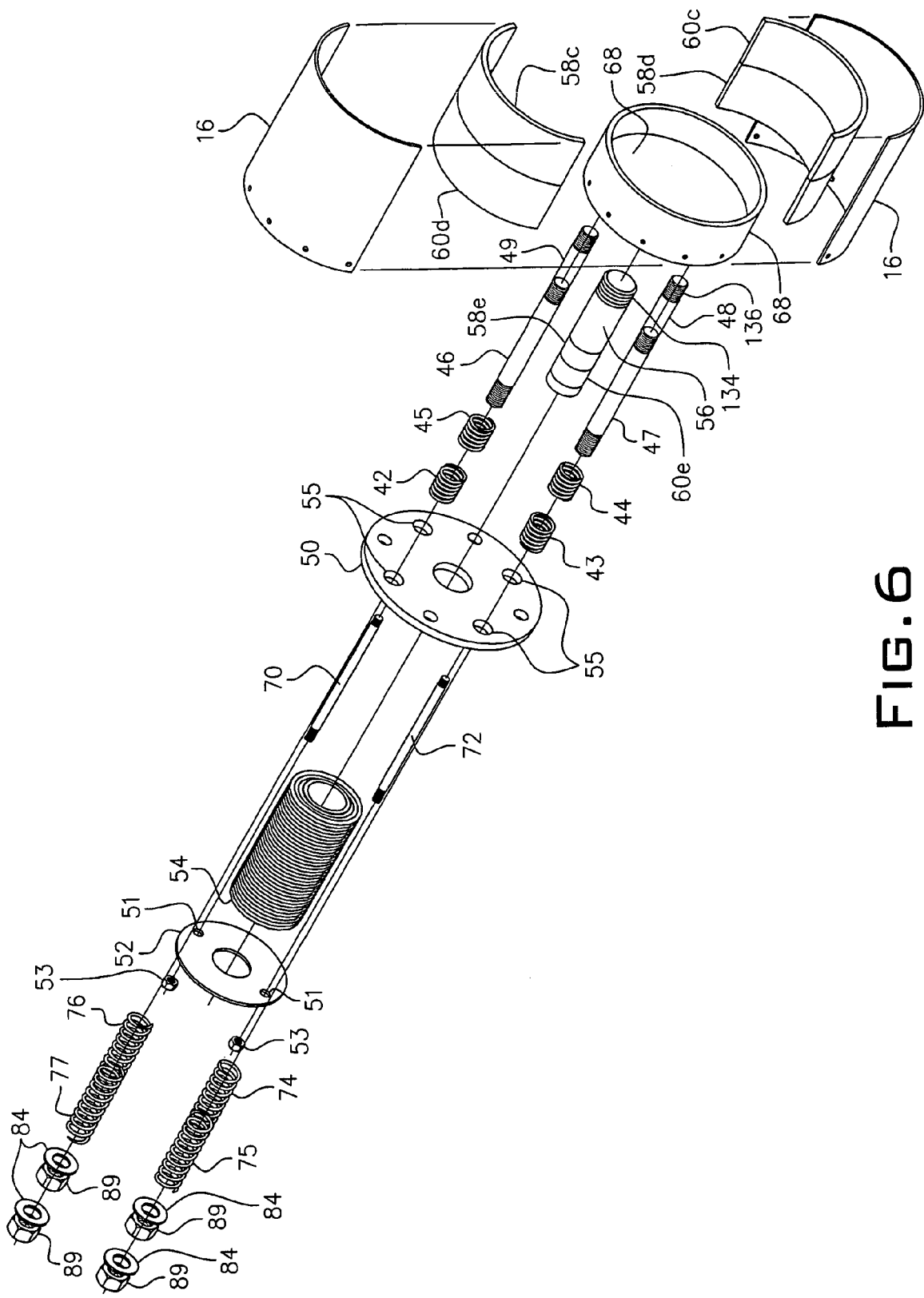
FIG. 6 is an exploded view of the outer and inner magnetic housings.
Figure 7:
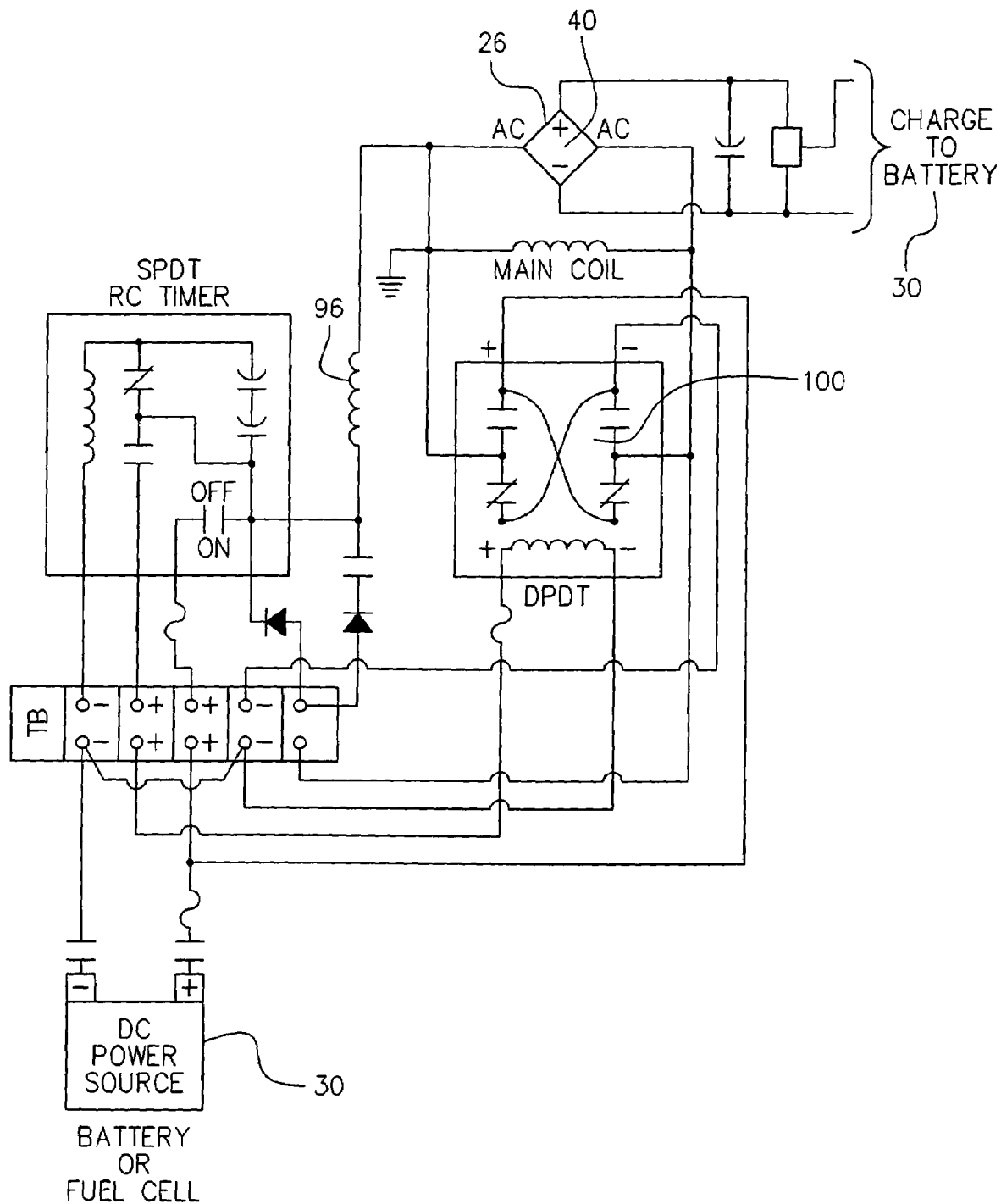
FIG. 7 is a schematic view of the electrical system of the magnetically driven motor.

Referring to FIGS. 4-6, main coil 54 is mounted between keeper plate 52 and coil plate 50. Mounting rods 46, 47, 48 and 49 are threaded 136 at a first end to the back of drum 68 within outer magnetic housing 16. The mounting rods pass through apertures 55 in coil plate 50. Compression springs 42, 43, 44 and 45 are positioned over corresponding mounting rods 46, 47, 48 and 49 between the back of drum 68 and the front of coil plate 50. Buffer springs 74, 75, 76 and 77 are positioned over the rear portion of the same corresponding mounting rods between a back wall of the coil plate 50 and washers 84 and nuts 89 which terminate mounting rods 46, 47, 48 and 49 as seen in FIG. 4.

The coil plate 50 is bolted to flanges 82 in the spring housing by threaded bolts 57 threaded to threaded openings 78 in the flanges 82.

Upon receiving current from the magnetic sensor 26, main coil 54, spaced apart from the inner wall 86, linearly moves within the spring housing 14 and causes the housing 18 to rotate and provide needed torque.

Inside the main or actuating coil 54 is positioned an armature 56 with magnets 58e and 58f having a north polarization and magnets 60e and 60f having a south polarization.

In opening 22 in the generator housing 12 a north polarization magnet 58 and a south polarization 60 are spaced apart by a gap 94. Shaft 20 has a north polarization magnet 58a and a south polarization magnet 60a. Coil 96 surrounds shaft 20 behind magnet 58a and 60a spaced apart by a gap 94a.

Inner rotating magnetic housing 18 has a north polarization magnet 58b and south polarization magnet 60b separated by gap 94b. The inner surface of outer magnetic housing 16 has juxtaposed north polarized magnets 58c and 58d and south polarized magnets 60c and 60d separated by gap 94c.

The inner magnetic housing 18 integral with shaft 20 turns in response to oscillation of magnets 58a/60a, 58c/60c and 58d/60d. The springs 42, 43, 44 and 45 are compressed at a tension of about 500 ft/lbs. The buffer springs 46, 47, 48 and 49 merely act to return the spring housing to a start position.

Air gap adjustments are made through one of four openings 132 in spring housing 14. Armature 56 which contains north magnet 58f and south magnet 60f is adjusted by threaded bolt 130 at a rear end of housing 14. By tightening down on bolt 130, the armature 56 within coil 54 is moved. The front end of armature 56 is threaded 134 to engage threads in drum support ring 68. In addition, threaded ends 136 of mounting rods 46, 47, 48 and 49 engage threads in the support ring 68.

The magnetic field created by outer magnetic housing 16 and linear movement of coil 54 causes the rotor or inner magnetic housing to turn, thus causing rotation of shaft 20.

The magnets employed in this invention are preferably permanent niobium magnets. Other suitable permanent magnets can be substituted. The speed of the turning shaft 20 is dependent on the frequency of the relay vibration.

Equivalent components can be substituted for the components in this invention to provide substantially the same function in substantially the same way to provide substantially the same results.

Having thus disclosed the invention, what is claimed and desired to be secured by Letters Patent follows:

1. An electromagnetic rotary motor comprising:
a generator at a first end, a spring housing at a second end, an outer magnetic housing enclosing an inner rotating magnetic housing between the generator and the spring housing, a shaft integral with the inner magnetic housing, the shaft passing through an opening in the generator, an end portion of the shaft distal from the inner magnetic housing having mounted thereon a north polarization magnet and a south polarization magnet spaced apart from each other;
a magnetic sensor mounted above the end portion of the shaft, the sensor alternating north and south magnetic fields in response to movement of the shaft and sending a D.C. signal to the spring housing to cause an actuating coil to move linearly and cause the inner magnetic housing to rotate.

2. The electromagnetic rotary motor according to claim 1 wherein a D.C. battery initially energizes the motor to shift the magnet fields.

3. The electromagnetic rotary motor according to claim 2 wherein the D.C. battery has 120 volts of power.

4. The electromagnetic rotary motor according to claim 2 wherein rotation of the shaft generates energy to recharge the battery.

5. The electromagnetic rotary motor according to claim 1 wherein adjustment bolts are used to adjust the position of a north and south magnet with respect to each other in the magnetic sensor.

6. The electromagnetic rotary motor according to claim 1 wherein electric energy from the sensor energizes multiple springs mounted on corresponding rods, the multiple spring positioned between the spring housing and a drum forming a back wall of the outer magnetic housing.

7. The electromagnetic rotary motor according to claim 6 wherein there are four buffer springs in the spring housing, each spring mounted over one of the mounting rods.

8. The electromagnetic rotary motor according to claim 1 wherein tension on an armature in the spring housing is controlled by a threaded bolt accessed through an opening in the spring housing.

9. An electromagnetic rotary motor comprising:
a generator housing at a first end, the generator housing having an annular longitudinal passageway containing a north and south magnet spaced apart, a first end of a shaft passing through the passageway, the shaft having a north and south magnet spaced apart around the shaft, a magnetic sensor mounted on the generator housing to view the first end of the shaft, the sensor alternating north and south magnetic fields in response to movement of the shaft;
the sensor sending a D.C. signal to a spring housing containing a movable actuating coil, the spring housing mounted distal from the generator and separated from the generator housing by an outer magnetic housing enclosing an inner rotating magnetic housing actuated by linear movement of the actuating coil, a second end of the shaft integral with the inner rotating magnetic housing.

10. The electromagnetic rotary motor according to claim 9 wherein multiple spaced apart north and south magnets are mounted in the outer magnetic housing.

11. The electromagnetic rotary motor according to claim 10 wherein a north and south magnet spaced apart is mounted on the inner rotating magnet housing.

12. The electromagnetic rotary motor according to claim 9 wherein the spring housing is connected to a back wall of the outer magnetic housing by multiple threaded mounting rods, each surrounded by a compression spring mounted between a coil plate and the back wall.

13. The electromagnetic rotary motor according to claim 9 wherein an armature containing spaced apart north and south magnets are mounted within the actuating coil mounted within the spring housing.

14. The electromagnetic rotary motor according to claim 9 wherein the north and south magnets are all permanent niobium magnets.

15. An electromagnetic rotary motor comprising:
a generator housing and a spring housing separated by a fixed outer magnetic housing surrounding a rotating inner rotating magnetic housing;
the generator housing having an annular opening containing north and south magnet spaced apart, a first end of a shaft passing through the annular opening, the shaft having a north and south magnet spaced apart around the shaft, a magnetic sensor mounted on the generator housing to view the first end of the shaft, the sensor alternating north and south magnetic fields in response to movement of the shaft;
the sensor sending an electrical signal to the spring housing, the spring housing containing a movable actuating coil surrounding an armature containing north and south magnets spaced apart, a means for adjusting the armature attached to an outer wall of the spring housing, multiple mounting rods connected to a back wall of the outer magnetic housing, the rod passing through a coil plate and terminating with a washer and nut holding a buffer spring in place over a rear portion of each mounting rod, a front portion of each rod supporting a compression spring positioned between the back wall of the outer magnetic housing and the coil plate; and
linear movement of the actuating coil causing the inner magnetic housing to rotate with a second end of the shaft.

16. The electromagnetic rotary motor according to claim 15 wherein the magnets are all permanent niobium magnets.

* * * * *